United States Patent
Huang et al.

(10) Patent No.: US 9,723,498 B2
(45) Date of Patent: Aug. 1, 2017

(54) AUTOMATICALLY UPDATING AN ACCESS POINT

(71) Applicant: Google Inc., Mountain View, CA (US)

(72) Inventors: Jonathan Huang, Sunnyvale, CA (US); Paul Allan Covell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 14/308,633

(22) Filed: Jun. 18, 2014

(65) Prior Publication Data

US 2015/0373561 A1    Dec. 24, 2015

(51) Int. Cl.
*H04W 24/02* (2009.01)
*H04L 12/24* (2006.01)
*H04W 88/08* (2009.01)

(52) U.S. Cl.
CPC ........... *H04W 24/02* (2013.01); *H04L 41/082* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,145,871 B2 | 12/2006 | Levy et al. | |
| 7,584,467 B2 * | 9/2009 | Wickham | G06F 8/65 717/171 |
| 8,402,109 B2 | 3/2013 | Marino et al. | |
| 2007/0198525 A1 * | 8/2007 | Chatterjee | G06F 21/572 |
| 2010/0077390 A1 * | 3/2010 | Nicoulin | G06F 21/10 717/171 |
| 2013/0013907 A1 * | 1/2013 | Marino | G06F 21/56 713/2 |
| 2013/0074061 A1 * | 3/2013 | Averbuch | G06F 8/665 717/171 |
| 2014/0052976 A1 * | 2/2014 | Marino | G06F 21/56 713/2 |
| 2014/0059530 A1 | 2/2014 | Banavalikar et al. | |
| 2014/0258699 A1 * | 9/2014 | Hsu | G06F 11/1417 713/2 |

* cited by examiner

*Primary Examiner* — Hassan Kizou
*Assistant Examiner* — Robert A Shand
(74) *Attorney, Agent, or Firm* — McDermott Will & Emery LLP (57) ABSTRACT

A method for seamlessly and automatically updating an access point or router. The method includes receiving an update for the access point and determining a status of a network traffic associated with the access point. The method further includes determining an update time for applying the update based on the determined status of the network traffic and applying the update to the access point at the determined update time. An access point receives an update for the access point, and waits for a time to apply the update. The access point waits until there is no interactive traffic in which a user is actively using the network. The access point applies the update and reboots. By waiting until there is no interactive traffic, the update process mitigates interruptions to the user's active use of the network.

17 Claims, 4 Drawing Sheets

AUTOMATICALLY UPDATING AN ACCESS POINT

BACKGROUND

The present disclosure relates generally to packet forwarding devices, such as routers or access points (AP) and more particularly to methods and systems for seamlessly auto-updating an AP.

A packet forwarding device, such as a router or access point (AP), connects one or more devices to a computer network. For example, a router can connect user devices to a Wide Area Network (WAN) such as the internet. The router may receive a software update. Applying the update may require the router to reboot, restart the routing layer, or otherwise disrupt the network connection.

SUMMARY

Aspects of the subject technology relate to a method of updating a packet forwarding device. The method includes receiving, by a packet forwarding device, an update for updating the packet forwarding device. The method further includes determining a status of a network traffic associated with the packet forwarding device and determining an update time for applying the update based on the determined status of the network traffic. The method further includes applying the update to the packet forwarding device at the determined update time.

Aspects of the subject technology also relate to a packet forwarding device comprising a port for communicating a network traffic associated with the packet forwarding device, a memory configured to store an update for the packet forwarding device, and a processor. The processor is configured to determine a status of the network traffic, determine an update time for applying the update based on the determined status of the network traffic, and apply the update to the packet forwarding device at the determined update time.

Aspects of the subject technology also relate to a packet forwarding device comprising a port for communicating a network traffic associated with the packet forwarding device, a memory configured to store an update for the packet forwarding device, and a processor. The processor is configured to receive the update, store the update in the memory, analyze a status of the network traffic, determine an update time for applying the update based on the analyzed status of the network traffic, apply the update to the packet forwarding device at the determined update time, and reboot the packet forwarding device.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In accordance with one or more implementations, methods and systems for seamless auto-updating of an access point are described. In one or more implementations, the access point determines a time to apply an update that reduces disruptions to the user's use of the network.

The subject technology provides systems and methods of automatically updating the AP. The AP may automatically determine, based on network traffic, the least disruptive time for applying the update. The AP may monitor network traffic, and further categorize it as interactive traffic and non-interactive traffic, such as background traffic. Interactive traffic may be network traffic corresponding to a user actively participating with, interfacing with, or otherwise using the user device's network connection. Non-limiting examples of interactive traffic include web browsing, video conferencing, streaming media, active use (e.g. playing) of a game console or other computing device, running a server, and an HTTP download. Non-limiting examples of background traffic include security camera feeds, game console or other computing device background downloads, and P2P downloads. Because applying the update may require disrupting the network connection, applying the update while there is interactive traffic may interrupt the user's use of the user device. To minimize interruptions to the user, the AP may determine an optimal time for applying the update.

Figure 1:
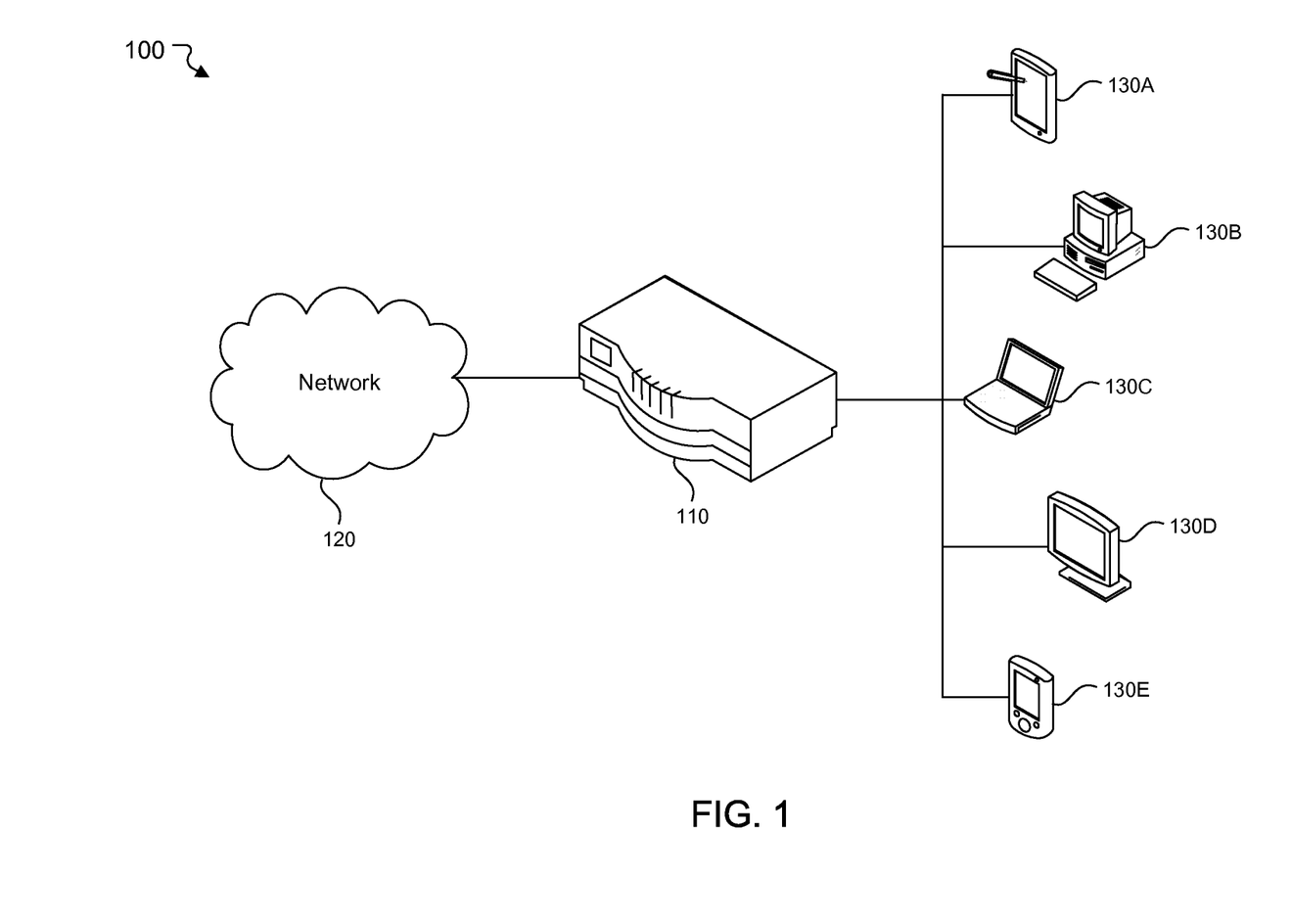
FIG. 1 depicts a network environment according to example aspects of the present disclosure.

FIG. 1 depicts one implementation of a router 110 according to example aspects of the subject technology. The router 110 may be an AP or other packet forwarding device, and may be configured for wired or wireless connections. The router 110 connects user devices 130A, 130B, 130C, 130D, and 130E (collectively referred to as user devices 130A-E) to a network 120, which may be, for example, the internet or other WAN. The user devices 130A-E may be, for example, computers, laptop computers, tablet devices, mobile devices, or other computing devices communicatively connected to the router 110. Although only 5 user devices 130A-E are shown in FIG. 1, in other implementations, more or less user devices may be connected. In certain implementations, user devices 130A-E may include other APs or routers.

The router 110 may receive an update from the network 120. In other implementations, the update may be provided through one of the user devices 130A-E, or through a storage device connected to the router 110. The router 110 may be configured to store the most recent update. Each update may supersede previous updates such that the router 110 may store only the most recent update. The update may further include a flag or other indicator of urgency or priority. The flag may correspond to a security urgency. For example, the producer of the update may determine that a particular update corrects an urgent security flaw and may appropriately set a high priority flag. The flag may correspond to a grace period in which the update should be applied. The grace period may be determined by the router 110, for example, by associating predetermined grace periods with specific flags. Alternatively, the grace period may be included with the flag, or the flag may be defined by the grace period. The grace period may be any appropriate time range. An urgent or high priority flag may correspond to a grace period of 24 hours. A lower priority flag may correspond to a longer grace period. A default grace period of, for example, 15 days may be used when the flag does not correspond to or indicate a specific grace period.

The router 110 may be configured to monitor a network traffic between the network 120 and the user devices 130A-E. For example, the router 110 may utilize a quality of service (QoS) protocol to analyze the network traffic. The router 110 may be able to determine or otherwise classify the network traffic to determine, based on a heuristic, an optimal update time to apply the update. The update time may be a specific time, or may be implemented as a trigger based on conditions, such as expiration of a countdown timer, or network traffic exhibiting a specified condition. In addition, at or near the update time, such as 10 seconds before, the router 110 may send a warning or otherwise notify the user devices 130A-E of the impending update application. One of the user devices 130A-E may be configured to override and cancel the update application. Alternatively, one of the user devices 130A-E may be configured to force the update before the update time, such as a user manually forcing the update or manually flashing the router using a flash drive. In other implementations, one of the user devices 130A-E may be configured to delay the update time, for example by a user-defined delay time.

According to example aspects of the subject technology, the heuristic may be based on an amount of interactive traffic. The router 110 may select an update time when the interactive traffic is at or below an interactive traffic threshold. The interactive traffic threshold may be a percentage of total network traffic, or a specific data rate or amount such as 0. The interactive traffic threshold may be determined based on historical usage or otherwise selected to minimize interruption or disruption of the user devices 130A-E. The update time may be predetermined, such as a time of day when the interactive traffic is expected to be at or below the interactive traffic threshold. The update time may be dynamically determined such that the router 110 may wait until the interactive traffic is currently at or below the interactive traffic threshold. For example, the router 110 may wait until the interactive traffic is 0, and immediately apply the update, or wait a predetermined delay period before applying the update. The predetermined delay period may be a preset time, such as 10 seconds, or may be determined by real-time traffic analysis.

The grace period may expire before the update is applied. For instance, during a 15-day grace period the interactive traffic may not have reached the interactive traffic threshold. The update time may then be set according to a fallback heuristic to force the update. The update may be applied to a predetermined time after the grace period ends. For example, the predetermined time may be 0 such that the update is applied immediately after the grace period ends. Alternatively, the predetermined time may be set at an expected time when the network traffic is at or below a traffic threshold. For example, the traffic threshold may correspond to the lowest expected network traffic, and the predetermined time may be 1 AM, when the user may unlikely to be using the network based on historical usage.

Figure 2:
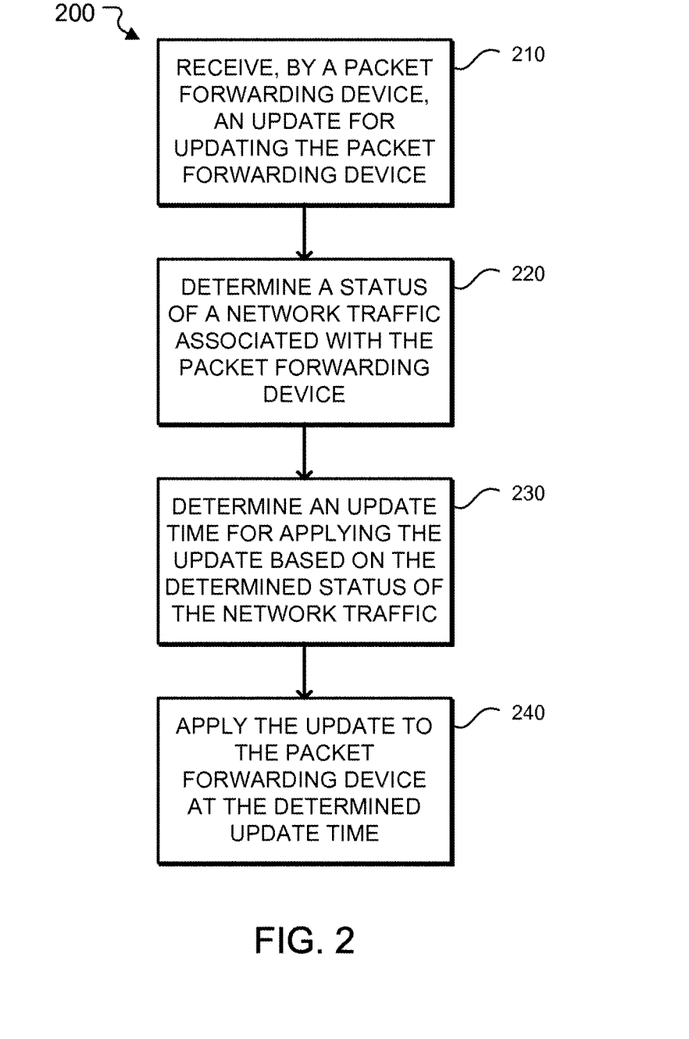
FIG. 2 shows a flowchart for auto-updating a packet forwarding device according to example aspects of the present disclosure.

FIG. 2 depicts a flowchart 200 of a process for automatically updating a packet forwarding device, such as the router 110, according to one implementation. At 210, the packet forwarding device receives an update for updating the packet forwarding device. The update may be an update to a boot image for the packet forwarding device, a firmware update, an operating system (OS) update, or other software update for the packet forwarding device. The update may be received from the WAN, or from another device connected to the packet forwarding device. The update may be received through manual selection, such as a user downloading the update. Alternatively, the update may be automatically received. For example, the packet forwarding device may periodically check for an update, or the update may be pushed to the packet forwarding device.

At 220, the packet forwarding device determines a status of a network traffic associated with the packet forwarding device. The status may be a current status of the network traffic, such as a current amount of interactive traffic. The status may also include historical usage data, which may further include analysis of usage patterns. For instance, the status may include analysis of interactive traffic patterns to further determine an interactive traffic threshold which may be based on average historical low interactive traffic levels. The interactive traffic threshold may further be based on a predetermined value, or an offset above historical low interactive traffic levels. Alternatively, the status of the network traffic may be based on overall traffic, a real time network traffic, or a historical network traffic associated with the packet forwarding device. A traffic threshold may be determined from the historical network traffic or may be a predetermined value. Determining the status of the network traffic may also include determining a number of active devices in communication with the packet forwarding device.

At 230, the packet forwarding device determines an update time for applying the update based on the determined status of the network traffic. The update time may be implemented as a date/time value selected based on the determined status of the network traffic. For example, the update time may correspond to a time when the interactive traffic is at or below the interactive traffic threshold, or expected to be at or below the interactive traffic threshold. Alternatively, the update time may correspond to a time when the network traffic is at or below, or expected to be at or below the traffic threshold. The update time may alternatively be determined as a predetermined time or delay after a trigger condition. For example, the update time may be 10 seconds after the interactive traffic reaches or falls below the interactive traffic threshold. In certain implementations, the update time may be determined based on the number of active devices in communication with the packet forwarding device. For instance, the number of active devices may drop a threshold percent or threshold difference, or may reach a threshold value, such as 0. The update time may be triggered by the number of active devices.

At 240, the packet forwarding device applies the update at the determined update time. Applying the update may require rebooting the packet forwarding device or otherwise resetting a state of the packet forwarding device such that the network traffic through the packet forwarding device may be interrupted. The determined update time minimizes disruptions to the network traffic.

The update may be configured to add no more than, for example, 10 seconds to the packet forwarding device's overall boot time, including any firmware updates. In addition, the update may be configured to allow the packet forwarding device to reboot without losing routing tables.

The update may not be applied correctly such that booting the new image may fail. The packet forwarding device may be configured to revert to an alternate version, such as an older version. The alternate version may be selected to ensure that the packet forwarding device connects to the WAN. In addition, the packet forwarding device may further detect a number of devices lost from or otherwise no longer connected to the network after restarting.

Figure 3:
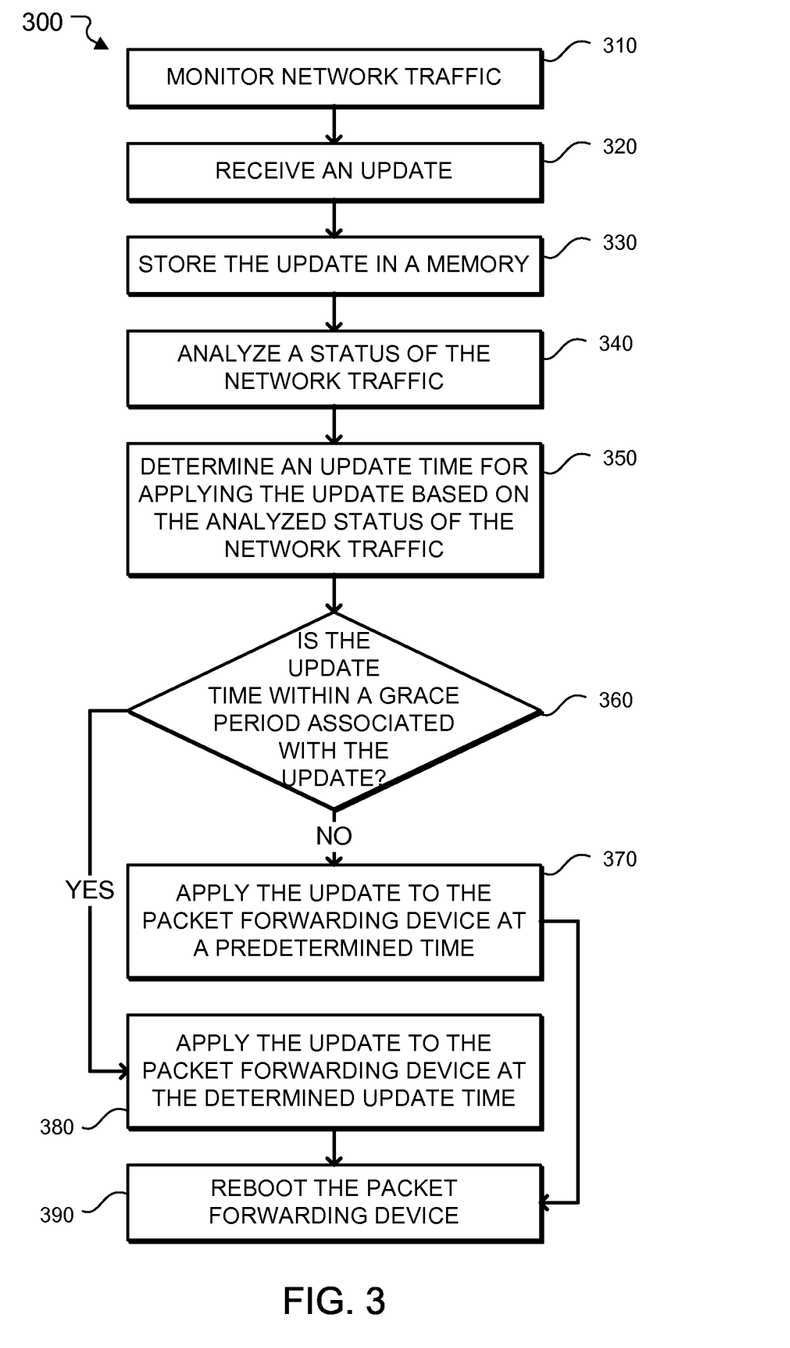
FIG. 3 shows another flowchart for auto-updating a packet forwarding device according to example aspects of the present disclosure.

FIG. 3 depicts a flowchart 300 of a process for automatically updating a packet forwarding device. At 310, the packet forwarding device monitors a network traffic associated with the packet forwarding device. The packet forwarding device may, for example, use QoS for monitoring the network traffic. The packet forwarding device may further maintain usage logs or other historical data for further analysis as described below.

At 320, the packet forwarding device receives an update. The update may be associated with a grace period. The grace period may be a default grace period, or may correspond to an urgency level of applying the update. The grace period may be a flag associated with a predetermined time value, or may be a time delay value.

When receiving the update, such as downloading the update from the WAN, the packet forwarding device may be configured to limit bandwidth usage, for example to 10% of available bandwidth, so as not to compete with a user. The packet forwarding device may also be configured to monitor metrics, such as CPU, Memory, and IO maximums, so that overall routing speed is not slowed more than, for instance, 10% while downloading the update. Monitoring the download of the update prevents the user from noticing slower network speed, particularly during interactive traffic.

The update may be distributed through one or more channels. For instance, one of several channels (e.g., stable, beta, developer, and canary) may be selected for receiving the update. The channels may provide different versions of the update. The user may manually select a preferred channel, or specifically select a version from a channel. The user may switch between the channels. Switching channels may further include clearing at least a portion of a storage of the package forwarding device.

At 330, the update is stored in a memory of the packet forwarding device. The packet forwarding device may be configured to store only one update, such as the most current version.

At 340, the packet forwarding device analyzes a status of the network traffic. The analysis may include analyzing historical data or other usage data to determine specific types of network traffic and associated and/or expected levels of activity. For example, the analysis may determine a period of time when the level of interactive traffic is the least. Alternatively, other types of network traffic, such as background, or more specific types of traffic, such as video streaming, may be analyzed.

At 350, the packet forwarding device determines an update time for applying the update based on the analyzed status of the network traffic. In certain implementations, the update time may be implemented by causing the packet forwarding device to wait until certain trigger conditions are met.

At 360, the packet forwarding device determines whether the update time is within the grace period associated with the update. The grace period may be a date/time value corresponding to a deadline in which the update should be applied, or may be a predetermined time value for a counter starting at the time the update was completely received. The determination may occur as a result of the grace period lapsing or expiring, or may be determined after the update time is determined, such as through comparison of time values.

If the update time falls within the grace period, at 380, the packet forwarding device applies the update at the determined update time. However, if the update time does not fall within the grace period, then at 370, the update is applied at a predetermined time. For example, the predetermined time may be a set delay, such as 24 hours after the grace period expires, or may be the first occurrence of reduced interactive traffic after the grace period expires. The predetermined time may alternatively correspond to a time when the network traffic or interactive traffic, is at or below or expected to be at or below a network traffic threshold or interactive traffic threshold, respectively.

After the update is applied, at 390, the packet forwarding device is rebooted. The reboot may alternatively be a reset of a state of the packet forwarding device, in order to propagate changes from the update.

A router or AP may perform one or more of the processes described above, or a combination or sub-combination of the processes described above. A combination or sub-combination of the processes described above for auto-updates may also be applied to networks with multiple APs, which may also have repeaters. When the update is applied to a given AP, the network traffic analyzed may correspond to the network traffic flowing over that AP, rather than the entire network. When the AP is also the uplink to a modem or other similar connection to a WAN, updating the uplink AP effectively requires auto-update of the entire network. In certain implementations, when the uplink AP auto-updates, other APs in the network may also accordingly auto-update. In other implementations, only the uplink AP auto-updates, such that other APs in the network may run different versions.

Figure 4:
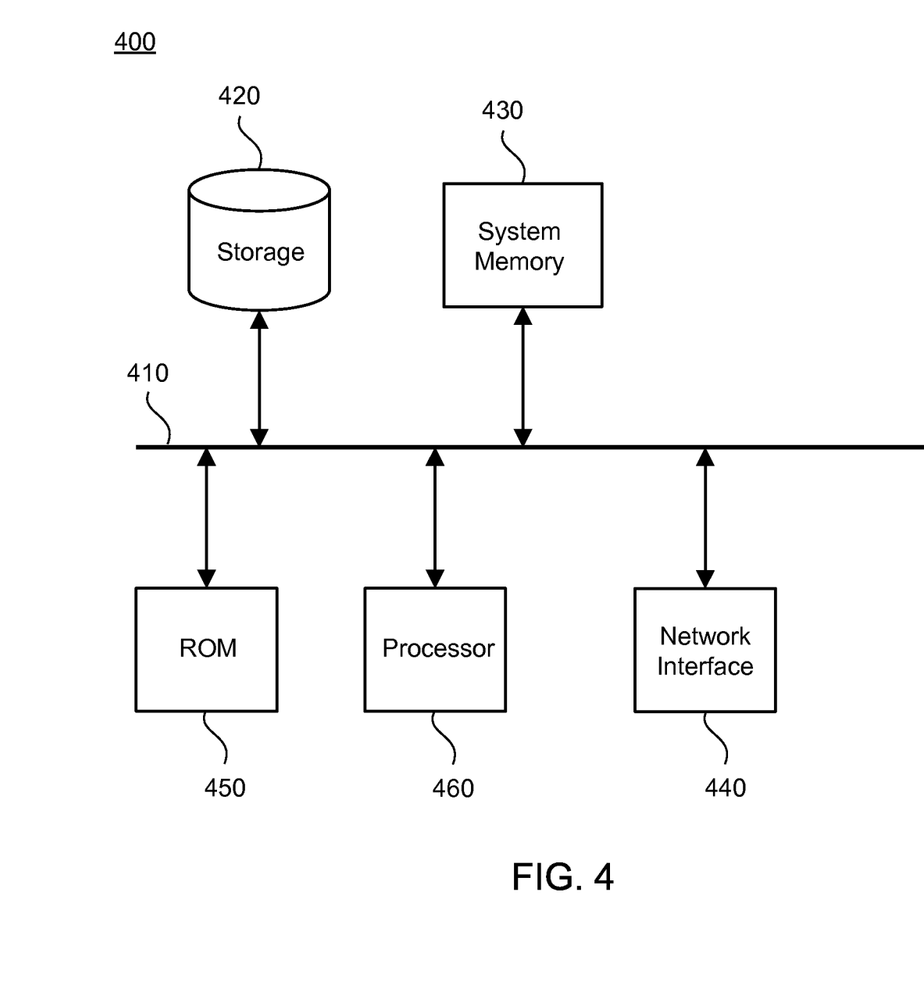
FIG. 4 shows a diagram of an electronic system according to example aspects of the present disclosure.

FIG. 4 conceptually illustrates an example electronic system with which some implementations of the subject technology can be implemented. Electronic system 400 can be a router, an access point, or any other sort of packet forwarding device. Such an electronic system includes various types of computer readable media and interfaces for various other types of computer readable media. Electronic system 400 includes a bus 410, processing unit(s) 460, a system memory 430, a read-only memory (ROM) 450, a permanent storage device 420, and a network interface 440.

Bus 410 collectively represents all system, peripheral, and chipset buses that communicatively connect the numerous internal devices of electronic system 400. For instance, bus 410 communicatively connects processing unit(s) 460 with ROM 450, system memory 430, and permanent storage device 420.

From these various memory units, processing unit(s) 460 retrieves instructions to execute and data to process in order to execute the processes of the subject disclosure. The processing unit(s) can be a single processor or a multi-core processor in different implementations.

ROM 450 stores static data and instructions that are needed by processing unit(s) 460 and other modules of the electronic system. Permanent storage device 420, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 420.

Other implementations use a removable storage device (for example, a floppy disk, flash drive, and its corresponding disk drive) as permanent storage device 420. Like permanent storage device 420, system memory 430 is a read-and-write memory device. However, unlike storage device 430, system memory 430 is a volatile read-and-write memory, such as a random access memory. System memory 430 stores some of the instructions and data that the processor needs at runtime. In some implementations, the processes of the subject disclosure are stored in system memory 430, permanent storage device 420, or ROM 450. For example, the various memory units include instructions for updating an access point. From these various memory units, processing unit(s) 460 retrieves instructions to execute and data to process in order to execute the processes of some implementations.

Finally, as shown in FIG. 34 bus 410 also couples electronic system 400 to a network (not shown) through a network interface 440. In this manner, the computer can be a part of a network of devices (for example, a local area network (LAN), a wide area network (WAN), or an Intranet, or a network of networks, for example, the Internet. Any or all components of electronic system 400 can be used in conjunction with the subject disclosure. The network interface 440 may communicate with wireless or wired connections such that the electronic system 400 may be a packet forwarding device for forwarding network communications between connected devices and networks.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method of updating a packet forwarding device, the method comprising:
   receiving, by the packet forwarding device, an update for updating the packet forwarding device;
   determining a status of network traffic associated with the packet forwarding device;
   determining an update time for applying the update based on the determined status of the network traffic;
   detecting the update time to be outside of a grace period associated with the update;
   setting the update to a predetermined time after expiration of the grace period; and
   applying the update to the packet forwarding device at the predetermined time after expiration of the grace period.

2. The method of claim 1, wherein determining the status of the network traffic further comprises determining whether the network traffic includes interactive traffic.

3. The method of claim 2, wherein determining the update time is further based on a time when the interactive traffic is at or below an interactive traffic threshold.

4. The method of claim 2, wherein determining the update time is further based on a time when the interactive traffic is expected to be at or below an interactive traffic threshold.

5. The method of claim 1, wherein the grace period corresponds to an urgency level of the update.

6. The method of claim 1, wherein the predetermined time after expiration of the grace period is based on when the network traffic is expected to be at or below a traffic threshold.

7. The method of claim 1, wherein determining the update time is further based on a time when the network traffic is at or below a traffic threshold or expected to be at or below the traffic threshold.

8. The method of claim 1, wherein determining the update time is further based on a number of active devices in communication with the packet forwarding device.

9. The method of claim 1, wherein determining the status of the network traffic is further based on a historical network traffic associated with the packet forwarding device.

10. The method of claim 1, wherein determining the status of the network traffic is further based on real-time network traffic.

11. A packet forwarding device comprising:
   a port for communicating network traffic associated with the packet forwarding device;
   a memory configured to store an update for the packet forwarding device; and
   a processor configured to:
      determine a status of the network traffic,
      determine an update time for applying the update based on the determined status of the network traffic,
      detect the determined update time to be outside of a grace period associated with the update,
      set the update to a predetermined time after expiration of the grace period, and
      apply the update to the packet forwarding device at the predetermined time after expiration of the grace period.

12. The packet forwarding device of claim 11, wherein determining the status of the network traffic further comprises determining whether the network traffic includes interactive traffic.

13. The packet forwarding device of claim 12, wherein determining the update time is further based on a time when the interactive traffic is expected to be at or below an interactive traffic threshold.

14. The packet forwarding device of claim 11, wherein the grace period corresponds to an urgency level of the update.

15. A packet forwarding device comprising:
   a port for communicating network traffic associated with the packet forwarding device;
   a memory configured to store an update for the packet forwarding device; and
   a processor configured to:
      receive the update;
      store the update in the memory;
      analyze a status of the network traffic;
      determine an update time for applying the update based on the analyzed status of the network traffic;
      detect the determined update time to be outside of a grace period associated with the update;
      set the update to a predetermined time after expiration of the grace period;
      apply the update to the packet forwarding device at the predetermined time after expiration of the grace period; and
      reboot the packet forwarding device.

16. The packet forwarding device of claim 15, wherein analyzing the status of the network traffic further comprises determining whether the network traffic includes interactive traffic.

17. The packet forwarding device of claim 15, wherein the grace period corresponds to an urgency level of the update.

* * * * *